Figure 1:
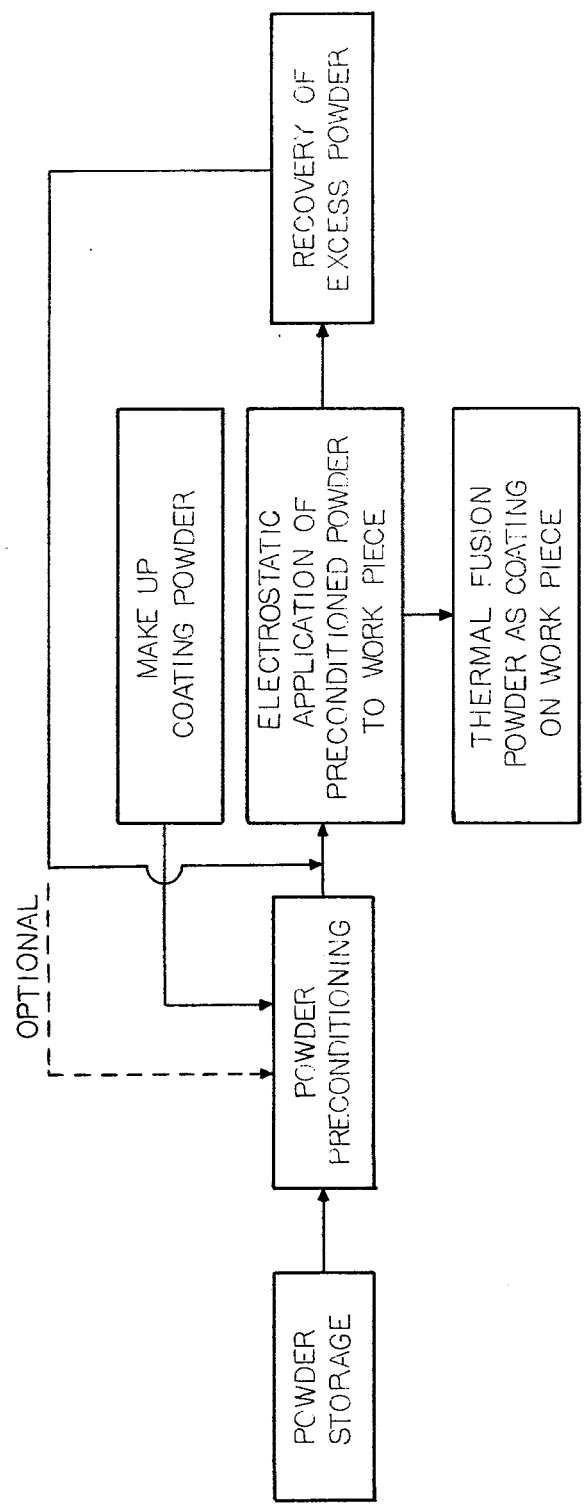

United States Patent [19]

Heckman et al.

[11] 4,288,466
[45] Sep. 8, 1981

[54] POWER PRECONDITIONING FOR ELECTROSTATIC APPLICATION

[75] Inventors: Russell W. Heckman, Perrysburg; George A. Nickey, Toledo, both of Ohio

[73] Assignee: Owens-Illinois, Inc., Toledo, Ohio

[21] Appl. No.: 54,326

[22] Filed: Jul. 2, 1979

Related U.S. Application Data

[60] Division of Ser. No. 923,868, Jul. 12, 1978, Pat. No. 4,170,074, which is a continuation of Ser. No. 747,586, Dec. 6, 1976, abandoned.

[51] Int. Cl.³ .......................... B05D 1/06; B05D 7/22; B05D 3/02; F26B 17/10
[52] U.S. Cl. ........................................ 427/28; 34/10; 427/29; 427/182
[58] Field of Search .................. 118/629-635, 118/602, 610, 612, DIG. 5, 308, 310, 311, 312; 427/25-29, 185, 180-183; 34/10, 22, 57 A, 57 D; 406/1 NQ; 239/690-708

[56] References Cited

U.S. PATENT DOCUMENTS

| 2,642,033 | 6/1953 | Miller | 118/308 |
|---|---|---|---|
| 2,792,971 | 5/1957 | Kaiser | 118/308 X |
| 2,856,273 | 10/1958 | Beber | 34/57 D |
| 3,183,113 | 7/1974 | Gemmer | 427/195 X |
| 3,411,465 | 11/1968 | Shirai | 34/57 D X |
| 3,423,843 | 1/1969 | Laguilharro | 34/57 D |
| 3,453,134 | 7/1969 | Haw | 427/29 |
| 3,670,699 | 6/1972 | Sargent | 118/629 |
| 3,690,298 | 9/1972 | Venturi | 118/629 |
| 3,720,533 | 3/1973 | Gallagher | 118/308 X |
| 3,850,660 | 11/1974 | Ianamura et al. | 118/63 X |
| 3,887,337 | 6/1975 | Descamps et al. | 34/57 A X |
| 3,889,388 | 6/1975 | Oguri et al. | 34/57 D X |
| 3,901,184 | 8/1975 | Payne et al. | 118/629 |
| 3,999,508 | 12/1976 | Rop et al. | 118/308 X |
| 4,009,301 | 2/1977 | Heckman et al. | 427/29 X |
| 4,018,185 | 4/1977 | Myers | 118/629 X |
| 4,035,152 | 7/1977 | Long et al. | 34/57 A X |
| 4,044,717 | 8/1977 | Provost | 118/629 |
| 4,127,815 | 11/1978 | Vild et al. | 118/308 X |

Primary Examiner—Morris Kaplan
Attorney, Agent, or Firm—H. G. Bruss; Myron E. Click; David H. Wilson

[57] ABSTRACT

Organic hygroscopic powders are preconditioned to render them free flowing and to facilitate their electrostatic application to preheated workpieces. The preconditioning technique includes drying the powder prior to electrostatic application to remove moisture and break up agglomerates using a fluidized bed drying process with concurrent mechanical agitation to form a substantially dry, free flowing powder.

7 Claims, 2 Drawing Figures

POWER PRECONDITIONING FOR ELECTROSTATIC APPLICATION

This is a division of application Ser. No. 923,868 filed July 12, 1978, now U.S. Pat. No. 4,170,074, which is in turn a continuation of Ser. No. 747,586, filed Dec. 6, 1976, now abandoned, the disclosures of which are incorporated by reference.

This invention relates to the preconditioning or organic coating powders for electrostatic application techniques. More particularly the present invention concerns the preconditioning of hygroscopic organic isomer resins to render them particularly suited for electrostatic application to preheated workpieces in the form of glass containers.

Techniques for coating preheated workpieces in the form of glass containers are well known in the art and form no part of the present invention per se. Such electrostatic application techniques are exemplified by commonly assigned copending application Ser. No. 503,321 filed Sept. 5, 1974, now U.S. Pat. No. 4,009,301 and U.S. Pat. Nos. 3,895,126; 3,860,104; 3,837,853; and 3,937,854.

Basically these electrostatic coating processes involve preheating the glass containers to a suitable temperature such as in the range of about 150° to 425° F. and usually in the range of about 250° F. to about 350° F., transferring the preheated glass containers to an electrostatic application station applying (usually from a spray nozzle) the coating powder at a different electrostatic potential with respect to the preheated glass containers, and heating the coated glass container to about 350° to 425° F. (usually at about 400° F. to 425° F.) to coalesce the applied powder on the container and form a smooth, coating film which usually has a thickness of about 1 to about 15 mils. The coated container is then cooled to room temperature.

In the electrostatic application technique the powder particles are pneumatically handled and applied and it is essential that the powders are free flowing. Therefore, the powders must be free of agglomerates, readily flow through the various hoppers and ducts, and readily pass through the fine apertures in the electrostatic spray nozzles to form a uniform deposit on the containers. Unfortunately, many of the commercially available electrostatic coating powders are hygroscopic in nature and tend to become a tacky and agglomerate due to the increase in moisture content upon storage at ordinary room temperature conditions. This makes the powders difficult to handle and apply as a uniform coating.

Accordingly it is an object of the present invention to provide a technique for preconditioning coating powder immediately prior to electrostatic application which overcomes these difficulties of the prior art and facilitates the handling and application of uniform coatings.

In attaining the objects of the invention one feature resides in a process for applying hygroscopic powder to coat a preheated workpiece wherein the powder is electrostatically applied to the workpiece in a powder application station and the adhered powder is subsequently thermally fused on said workpiece to form a smooth coating, the improvement wherein said hygroscopic powder is preconditioned in a preconditioning zone prior to electrostatic application to the workpiece by passing a stream of dry, inert gas upwardly through a mass of the powder at a rate sufficient to suspend said powder in said stream as a fluidized bed and mechanically agitating the resulting fluidized bed for a residence time sufficient to yield a substantially dry, free flowing powder and then transferring the resulting preconditioned powder to the electrostatic application station.

Means to effect the process of the present invention resides in an apparatus for suspending and drying powder in the form of a fluidized bed, said apparatus comprising an upright tubular chamber having an inlet for fluidizing gas positioned near the bottom, a porous, gas permeable membrane positioned within said chamber above said fluidizing gas inlet for distributing fluidizing gas and retaining powder, an outlet for fluidizing gas positioned near the top of said chamber, an inlet for powder, and an outlet for removing powder by aspiration, the improvement wherein said outlet for said powder is in the form of a duct extending into said chamber axially of said chamber, said duct having a first opening adapted to be above the level to be occupied by the fluidized bed, and a second opening adapted to be below the level to be occupied by the fluidized bed, said chamber further including a rotatable impeller for mechanically agitating powder in said chamber, said impeller being positioned intermediate said porous membrane and said duct.

In a preferred embodiment of the present invention the hygroscopic powder is an ionomer copolymer resin available from the DuPont Company under the trade name of Surlyn AD 5001 ionomer powder. This ionomer resin is a fine white powder having weight average particle size in the range of about 40 microns to about 60 microns, a bulk density of about 25 to 35 pounds per cubic foot and a moisture content of about 0.5% to about 1.0% by weight as received.

Such ionomeric copolymers are described in a series of articles published in American Chemical Society Polymer Preprints; Volume 6, No. 1, (April, 1965) pages 287–303, Volume 8, No. 2 (September, 1967) pages 1130–1137, and Volume 9, No. 1, (April, 1968) pages 505–546. The ionomeric polymer described therein is a partially ionized copolymer of ethylene and methacrylic acid. The methacrylic acid component of the ionomeric polymer provides carboxylic groups which may promote coating formation of glassware surfaces.

Such ionomeric polymers are also described in detail in U.S. Pat. No. 3,264,272, as being a polymer of an alpha-olefin having the general formula $RCH=CH_2$ where R is radical selected from the class consisting of hydrogen and alkyl radicals having from 1 to 8 carbon atoms, the olefin content of said polymer being at least 50 mol percent based on the polymer, and an alpha, beta-ethylenically unsaturated carboxylic acid having 1 or 2 carboxylic acid groups.

Metal ions suitable for forming the ionomeric polymer patents are listed in U.S. Pat. No. 3,264,272 and include $Na^+$, $K^+$, $Li^+$, $Cs^+$, and $Zn^+$. The composition of such powders are well known in the art and form no part of the invention per se.

Figure 2:
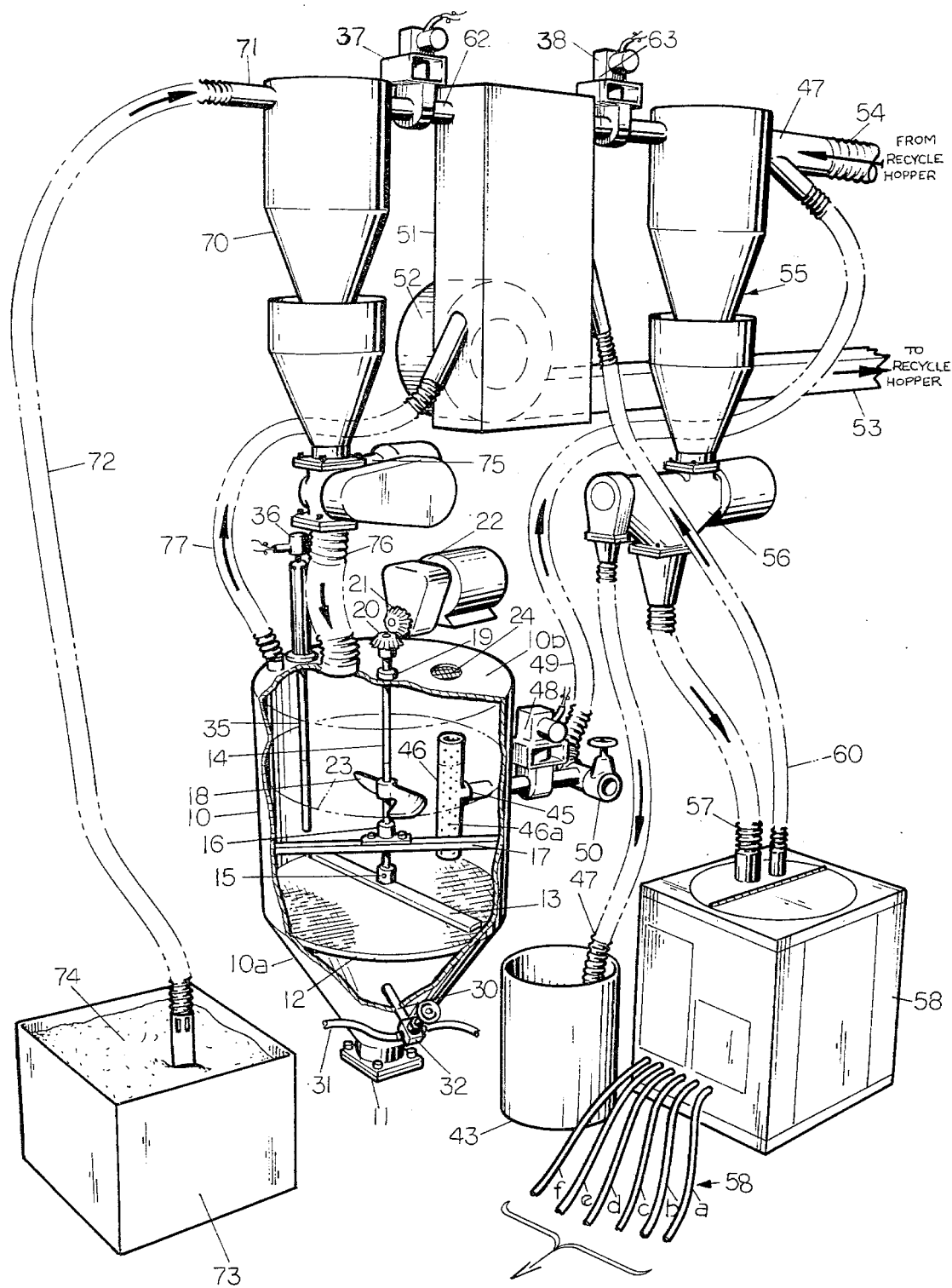

The principles of the present invention will be more readily understood by reference to the drawings and descriptions that follow wherein FIG. 1 is a schematic process flow diagram illustrating the process of invention and FIG. 2 is a more detailed representation of the process of FIG. 1 illustrating the particular apparatus of invention.

In accordance with the process as illustrated in FIG. 1, powder from storage is conveyed to the fluidized powder preconditioner where it is fluidized as a bed with a dry fluidizing gas such as air, nitrogen or other gas which is inert with respect to reaction to the powder. Air is preferred gas for economy and efficiency. For efficient drying the gas should have a dew point of less than about 35° F. and preferably below about 20° F.

The temperature of the fluidizing gas should be low enough so that it does not cause tackiness or fusion of the powder particles being preconditioned. For applications involving "Surlyn" inomer powders, the gas having a temperature from room temperature (e.g. about 70° F.) up to about 110° F. is quite effective. Lower temperatures can be used although they are less effective.

The residence time for preconditioning the powder in the fluidizing bed is not critical to the practice of the present invention so long as the resulting powder is substantially dry, free of agglomerates, and is free flowing. This can usually be accomplished in a residence time of about 5 minutes or less to about 2 hours or longer with about ¼ hour to about ¾ hours suitable for most applications.

It is difficult to specify with certainty how much moisture is actually removed during preconditioning to render the powder dry and free flowing because it is the surface moisture on the individual particles rather than the overall bulk moisture which causes the problem. Thus to specify that the overall moisture content is a certain percentage is not significant when a very slight proportion of surface moisture can result in tackiness and agglomeration. It is believed that the overall moisture content is probably reduced somewhat although this is not believed to be controlling. Thus when the term "substantially dry" is used herein it refers to the removal of sufficient surface moisture to cause the powder to be free flowing.

Referring now to FIG. 2 reference numeral 10 indicates a fluidized bed preconditioning chamber generally in the form of a tubular cylindrical chamber with top 10*b* equipped with vent 24 which communicates with the ambient and a conical bottom 10*a* which is equipped with access port 11. Chamber 10 can be square, rectangular or other tubular shapes although cylindrical is geometrically convenient.

In a practical embodiment the chamber is made of steel alloy and has a cylindrical sidewall of about 3 to 4 feet in length, a diameter of the cylinder of about 3 to 4 feet, and a conical bottom section of about 2 to 3 feet in length.

Positioned within tank 10 is porous diffusion membrane 12 which can be a conventional gas diffusion membrane used in fluidized bed dryers. Such membranes can be made of porous plastic, porous cellulosic matts, porous ceramic or porous metal although a membrane made of having a porosity of about 70% and an average pore size of about 20 microns is quite suitable for the present purposes. Such a membrane is commercially available from Michigan Chrome and Chemical Company under the tradename of Miccron Diffusion Plate. Membrane 12 also functions to retain the powder and prevent it from entering the conical bottom section 10*a*.

Centrally positioned within chamber 10 is mechanical agitator in the form of a solid rigid impeller 13 which extends to near the sidewalls of chamber 10. Agitator 13 is attached to shaft 14 by coupling 15. Shaft 14 is supported by bearing assembly 16 mounted on support bracket 17 which is fastened to the sidewalls of chamber 10. Also mounted on shaft 14 is supplemental agitator in the form of mixing blade 18. Shaft 14 passes through the top 10*b* of chamber 10 through support bearing 19 and terminates in gear 20. Gear 20 is intermeshed with drive gear 21 on electrical motor assembly 22 which is adapted to drive shaft 14 low speeds (e.g. about 5 to 50 rpm).

Impeller 13 is positioned for rotation parallel to membrane 12 at a distance of about 1 to 2 inches therefrom. In operation impeller 13 rotates at the rate of about 10–20 rpm to mechanically agitate the powder within chamber 10 to break up agglomerates and assure intimate contact of individual powder particles with the fluidizing gas. Mixing blade 18 is optional and is used to further mix the fluidized bed which is normally maintained to a height indicated by dashed line 23.

Below membrane 12 through conical bottom 10*a* is mounted nozzle 30 through which dry air or other fluidizing gas blows in bottom 10*a*. The volume of air passing into nozzle 30 is regulated by valve 32 (which can be manual or automatic) on supply pipe 31. Several of such nozzles 30 are located about conical bottom 10*a* although only one such nozzle is illustrated for convenience. Nozzle 30 terminates within chamber 10 beneath membrane 12 so that any gas passing through nozzle 30 will contact the membrane and be evenly dispersed within the chamber 10.

Preconditioning chamber 10 is also equipped with a level control probe 35 and read out device 36 of conventional design which electronically monitors the level of fluidized bed within chamber 10 and electronically actuate make up valve 37 and recycle valve 38 to automatically balance the preset fluidized bed level with the rate consumption of powder from supply hopper 58 as will be described below.

Chamber 10 is also equipped with powder outlet duct 45 in the form of a tube through which the dry free, flowing powder is withdrawn from the fluidized bed by aspiration (i.e. venturi action). Outlet duct 45 connects to and communicates with a vertical tube 46 which is open at both ends and extends axially with respect to the chamber 10. Tube 46 terminates above impeller 13 so that it is a clearance of about 5 to 10 inches between impeller 13 and the open bottom of tube 46. Tube 46 is provided with several apertures 46*a* to assist in the withdrawal of powder from chamber 10. The open top end of tube 46 is above the level of the fluidized as represented by dashed line 23 so as to withdraw gas from chamber 10 for transferring the powder.

Tube 45 passes through the sidewall of chamber 10 and is provided with flow control valve 48 which regulates the withdrawal rates of dry powder. Downstream of valve 48, tube 45 connects to tubing 49 which is equipped with vent valve 50. Tubing 49 in turn connects to the inlet 47 of cyclone assembly 55 which has internal baffles which separate the powder from the gas stream so that powder does not pass through cyclone outlet conduit 63. Cyclone assembly 55 discharges the separated powder into rotary control valve assembly 56 which controls the flow of powder through tubing 57 into supply hopper 58 which is vented to vacuum tank 51 through vent conduit 60. Conduit 60 has a flow restriction therein so that the flow is primarily out through outlets 58*a* to *f*. The purpose of vent 60 is to prevent "dusting" when tank 58 is opened. Any overflow from control valve 56 passes through overflow tube 47 into container 43. The powder is withdrawn from supply hopper 58 through outlets 58*a–f* and are fed directly to a conventional electrostatic application station (not shown) where it is applied to the glass containers as described above. The excess powder from the electrostatic application is recovered in a recycle hopper not shown and is recycled to cyclone assembly 55 through duct 54.

Chamber 10 is fed with make up powder from powder 74 make up reservoir 73 through conduit 72, cyclone assembly 70, rotary valve 75 and conduit 76. Cyclone assembly 70 is equipped with powder inlet 71 which in turn communicates with conduit 72 which leads to powder make up reservoir 73 which contains make up powder 74. Cyclone assembly 70 discharges into rotary control valve assembly 75 which communicates with top 10a of chamber 10 into conduit 76. Cyclone assembly communicates with suction tank 51 by conduit 62 equipped with flow control valve 37. Cyclone assembly 70 is equipped with an internal baffle which prevents powder from passing out through conduit 62.

Chamber 10 in turn is vented to suction tank 51 through vent conduit 77 which also communicates with the top of tank 10. Conduit 77 has a flow restriction therein so that the flow is primarily out through duct 46. The purpose of vent 77 is to prevent "dusting" when chamber 10 is opened.

Vacuum tank 51 is provided with suction blower 52 which reduces the pressure within suction tank 51 with respect to the pressure in chamber 10 and causes the pressure differential for gas flow and pneumatic transfer of the powder through the system as indicated by the arrows. Suction blower 51 discharges into duct 53 which in turn discharges into recycle hopper (not shown) where the powder is recovered for recycle. Suction tank 51 communicates with cyclone assemblies 55 and 70 by means of conduits 62 and 63 as described above. Conduit 62 is provided with flow control valve assembly 37 and conduit 63 is provided with flow control valve assembly 38. Control valve assemblies 37 and 38 are automatically operated in response to the read out device 37 to control the proportion of recycle powder to make up powder to maintain the proper level 23 in chamber 10 in response to the rate at which powder is being used from supply hopper 58.

In operation fluidizing gas such as dry air passes through nozzle 30 to fluidize the powder in chamber 10 to the level 23. Cyclone assembly 55 is maintained at a lower pressure with respect to chamber 10 so that powder is withdrawn through duct 46 through tube 49 into the intake 47 of cyclone assembly 55 where it combines with recycle powder from conduit 54 from the recycle hopper. Flow control valve 39 is in the open position and flow control valve 37 is either closed or slightly open to admit make up powder 74 through inlet 71 in cyclone assembly 70 as may be required to maintain the preset fluidized bed level in chamber 10.

When Surlyn AD 5001 powder which is tacky and agglomerated into lumps by storage is preconditioned with air at room temperature with agitation for a residence time of about ½ hour to form a substantially, dry free flowing powder and used to coat preheated glass containers to a thickness of about 10 mils according to the process of U.S. Pat. No. 4,009,301, the powder readily flows through the system as is easy to apply as a smooth coating. When the powder is used as above but without preconditioning, the powder does not flow readily and clogs the electrostatic spray equipment.

For convenience in disclosure, all patent documents and publications mentioned herein are incorporated by reference.

Having thus described the invention, what is claimed is:

1. In the process for applying organic hygroscopic powder to coat a preheated glass container wherein said powder is electrostatically applied to said glass container in a powder application station and the adhered powder is subsequently thermally fused on said glass container to form a smooth coating, the improvement wherein said hygroscopic powder is preconditioned in a preconditioning zone prior to electrostatic application to said glass container by passing a stream of dry, inert gas having a dew point of less than about 35° F. upwardly through a mass of said powder at a rate sufficient to suspend said powder in said stream as a fluidized bed and mechanically agitating said fluidized bed for a residence time sufficient to yield a substantially dry, free flowing powder, separating the free flowing powder from said stream by aspirating through an outlet disposed intermediate of open ends of a vertical conduit immersed in said bed, and then transferring said free flowing powder to the electrostatic application station.

2. The process of claim 1 wherein said gas is air.

3. The process of claim 1 wherein said gas has a temperature of less than about 110° F.

4. The process of claim 1 wherein said powder has a residence time in said fluidized bed of about 5 minutes to about 2 hours.

5. The process of claim 4 wherein said residence time is about ¼ hour to about ¾ hour.

6. The process of claim 1 wherein said coating powder is an ionomer resin.

7. The process of claim 5 wherein said powder has an average particle size diameter in the range of about 40 to 60 microns.

* * * * *